United States Patent

Yamaguchi et al.

Patent Number: 5,983,700
Date of Patent: Nov. 16, 1999

[54] CALIBRATION METHOD OF A FLOW SENSOR OUTPUT

[75] Inventors: Takayuki Yamaguchi; Yukito Sato; Hiroyoshi Shoji; Junichi Azumi; Morimasa Kaminishi, all of Miyagi, Japan

[73] Assignees: Ricoh Company Ltd., Tokyo; Ricoh Elemex Corporation, Nagoya, both of Japan

[21] Appl. No.: 09/065,726

[22] Filed: Apr. 24, 1998

[30] Foreign Application Priority Data

Apr. 25, 1997 [JP] Japan .................................. 9-108716

[51] Int. Cl.[6] ................................................... G01F 25/00
[52] U.S. Cl. ............................ 73/1.34; 73/23.21; 73/23.24
[58] Field of Search .................... 73/1.34, 23.21, 73/23.24

[56] References Cited

U.S. PATENT DOCUMENTS

| | | | |
|---|---|---|---|
| 3,913,379 | 10/1975 | Rusz et al. | 73/23.21 |
| 4,341,107 | 7/1982 | Blair et al. | 73/1.34 |
| 4,838,483 | 6/1989 | Nurezyk et al. | 73/1.34 |
| 4,916,641 | 4/1990 | Bybee | 73/1.34 |
| 5,228,327 | 7/1993 | Bruck | 73/1.34 |
| 5,445,005 | 8/1995 | Willner et al. | 73/1.34 |
| 5,469,750 | 11/1995 | Lloyd et al. | 73/1.34 |
| 5,542,286 | 8/1996 | Wang et al. | 73/1.34 |

*Primary Examiner*—Hezron Williams
*Assistant Examiner*—Chad Soliz
*Attorney, Agent, or Firm*—Oblon, Spivak, McClelland, Maier & Neustadt,. P.C.

[57] ABSTRACT

A method of calibrating a zero point of a flow sensor includes the steps of detecting a transition of output of the flow sensor caused in response to a shut down of a fluid, and adjusting the zero point of a characteristic curve representing the output of the flow sensor and a flow rate, such that the indicated flow rate is zero immediately after the transition of the flow sensor output.

16 Claims, 12 Drawing Sheets

CALIBRATION METHOD OF A FLOW SENSOR OUTPUT

BACKGROUND OF THE INVENTION

1. Field of the Invention

The present invention generally relates to flow rate measurement of gases and more particularly to an output control of a flow sensor used in gas meters including a propane gas utility meter for flow rate measurement of a gas. Further, the output control of flow sensor of the present invention is applicable also to a flow sensor used in automobiles for air intake control. Particularly, the present invention relates to an output control of a composite flow meter that uses a fluidic sensor and a flow sensor for flow rate measurement of a gas.

2. Discussing of the Background

Flow-rate measurement of a gas is generally carried out by using a fluidic sensor. A fluidic sensor provides a reliable flow rate measurement as long as the gas flow rate is sufficiently large. When the gas flow rate is reduced, on the other hand, the sensitivity of the fluidic sensor decreases rapidly and the result of the flow rate measurement becomes no longer reliable.

Thus, in order to augment the foregoing decrease of sensitivity of fluidic sensors, it has been practiced to use a flow sensor of a different type in a flow meter, in addition to a fluidic sensor, so that a satisfactory sensitivity of flow rate measurement is guaranteed even in such a case in which the gas flow rate is very small. By using a heat-sensitive flow sensor for this purpose, for example, it is possible to construct a composite flow meter that has a high sensitivity of gas flow rate measurement from a very small flow rate value to a very large flow rate value.

In the case of a propane gas utility meter, there exists a prescribed standard or specification that imposes requirements that:

a) the gas utility meter should not produce output when the gas flow rate is 0 liter/hour;
b) the gas utility meter should be able to detect a gas flow when the gas flow rate has exceeded 3 liter/hour;
c) the gas utility meter should be able to detect the gas flow rate within an error of ±3% when the gas flow rate is in the range of 125–250 liter/hour; and
d) the gas utility meter should be able to detect the gas flow rate within an error of ±1.5% when the gas flow rate is in the range of 250–2500 liter/hour.

As the flow meter should not produce output when the flow rate is zero (0 liter/hour), the flow meter is provided with a dead zone in correspondence to the zero flow rate value, wherein the dead zone may have a width defined by an upper limit of 1.5 liter/hour in view of the requirement that the gas utility meter should be able to detect a gas leakage or gas flow when the gas flow rate has exceeded 3 liter/hour, which is twice as large as the foregoing width of the dead zone. Thus, a gas utility meter is designed to produce a zero output indicative of the flow rate of 0 liter/hour when the actual gas flow rate is smaller than 1.5 liter/hour. Further, there exists a standard or specification imposing a requirement that the aging of the gas utility meter output should be within ±2% in ten years.

In view of the foregoing various requirements prescribed in the form of standard, conventional gas utility meters employ various corrections for correcting the output of a flow sensor used therein in conformity with the standards.

For example, the Japanese Laid-Open Patent Publication 3-264821 describes a composite gas flow meter that uses a fluidic sensor for flow rate detection in the flow rate range of 125–2500 liter/hour in combination with a flow sensor that measures the gas flow rate in the range of 0–150 liter/hour, wherein the fluidic sensor is used for calibrating the output of the gas flow sensor in the flow rate range of 125–150 liter/hour in which both the output of the fluidic sensor and the output of the flow sensor are available.

Further, there is proposed, according to the Japanese Laid-Open Patent Publication 4-208818, a method of correcting the zero-point of a gas flow sensor indiscriminately by regarding the gas flow sensor output indicating a flow rate value smaller than a predetermined threshold flow rate value of the dead zone, as the zero flow rate. In other words, the foregoing conventional method defines the maximum allowable shift of the flow sensor output as being equal to the foregoing threshold of the dead zone and uses the flow sensor output as the zero point of the flow sensor output when the magnitude or absolute value of the flow sensor output is smaller than the foregoing threshold. It should be noted, however, that the flow sensor, operating on the principle of resistance measurement of a resistance strip exposed to the gas flow, produces an output signal of which value changes variously even when the gas flow rate is smaller than the foregoing threshold of the dead zone.

Further, the Japanese Laid-Open Patent Publication 8-271307 describes a composite flow meter that uses a fluidic sensor in addition to a gas flow sensor, wherein a discrimination is made periodically whether or not a calibration of the zero point should be conducted for the flow sensor output. When it is judged that it is the right time for calibration, the magnitude or absolute value of the flow sensor output is measured and a standard deviation of the absolute value thus measured is obtained. The zero point of the flow sensor output is thereby corrected based upon the standard deviation thus obtained.

According to the approach of the foregoing Japanese Laid-Open Patent Publication 3-264821, however, there is no guarantee that the flow rate suitable for the calibration of the flow sensor output occurs, as the value of the gas flow rate is ruled by the situation of the consumer. Thus, there is no guarantee that the desired calibration of the flow sensor output is achieved in the desired or scheduled time interval Further, the inventor of the present invention has discovered, in an aging experiment in which the gas flow sensor is subjected to an artificial aging process, that the flow sensor output, which tends to increase with increasing gas flow rate, experiences a parallel translation at the beginning of the aging process as indicated in FIG. 1, wherein it can be seen in FIG. 1 that only the intercept of the output characteristic curve at the zero flow rate experiences a shift at the beginning of the aging process. There is no substantial change in the gradient of the output characteristic curve. It should be noted that the foregoing artificial aging experiment is conducted by increasing the temperature of the resistance heater in the flow sensor.

Thus, the initial flow sensor output $y_0$, which is represented as $$y_0 = 0.0628x + 3.2524,$$

where x represents the flow rate, is changed to $$y_1 = 0.0628x + 2.9154$$

after the first artificial aging experiment. Thereby, it can be seen that the gradient of the flow sensor output characteristic curve does not change substantially and only the intercept at the zero flow rate (x=0) is changed.

On the other hand, it has been discovered, in a further aging experiment, which was conducted after the first aging experiment and induces a much larger aging effect in the resistance heater of the flow sensor, that the flow sensor output characteristic curve $y_2$ after such a second aging experiment is represented as $y_2=0.0616x+5.5495$.

In this case, it can be seen that there occurs a change in both the gradient and the intercept.

Summarizing above, it was discovered that the aging in the flow sensor output characteristic first occurs in the form of a displacement of the intercept or parallel shifting of the output characteristic curve. Thereafter, there occurs a change in both the intercept and gradient.

Thus, the approach of the Japanese Laid-Open Patent Publication 3-264821 raises a problem, in view of the prescribed tolerance of the flow rate measurement of ±3% for the flow rate range of 125–150 liter/hour, in that the tolerable error of the flow rate measurement, which takes a value of ±3.75 liter/hour for the flow rate of 125 liter/hour, well exceeds the width of the dead zone. It should be noted that the dead zone of the zero flow rate is set to 1.5 liter/hour or less. Thus, it is not possible to calibrate the deviation of the output characteristic of the gas flow sensor based upon the output of the fluidic sensor as taught by the foregoing Japanese Laid-open Patent Publication 3-264821.

Further, the process of the Japanese Laid-Open Patent Publication 3-264821 is ineffective for calibrating the time-dependent change of the flow sensor output in view of the necessity of calibrating both the gradient and the intercept of the flow sensor output characteristic when there is a severe aging. When the calibration is to be made on the gradient, which changes with time, the calibration for the intercept is no longer possible.

Further, the approach of the Japanese Laid-Open Patent Publication 4-208819 or of the Japanese Laid-Open Patent Publication 8-271307 raises a problem as noted below.

During an experimental investigation on the output characteristic of a gas flow sensor that detects the gas flow rate based upon a measurement of resistance of a heat-sensitive resistance strip, the inventor of the present invention has discovered that there exists a very large fluctuation in the flow sensor output when the actual gas flow rate is set to 0 liter/hour as indicated in FIG. 2. It is believed that this substantial fluctuation of the flow sensor output at the zero gas flow rate is caused by the accumulation of heat in the resistance strip of the flow sensor or by the convection of air occurring in the gas flow sensor.

It should be noted that the experiment of FIG. 2 is conducted by using a flow path having a width of 5 mm and a length of 25 mm, wherein the flow sensor is disposed on a top side of the flow path for measuring the flow rate of the gas or air through the flow path. It should be noted that the vertical axis of FIG. 2 represents the sensor output in terms of deviation from a preset flow rate, while the horizontal axis represents the actual flow rate in terms of liter/hour.

When the zero point calibration is made on the flow sensor thus configured according to the teaching of the Japanese Laid-Open Patent Publication 4-208818, there can occur a case in which the zero point is reset to the lowest point of the flow sensor output at the zero flow rate state. For example, the flow sensor output of −1.1 liter/hour may be defined as the new zero point of the flow sensor output. See FIG. 2. In such a case, the gas flow sensor would produce an output indicative of a non-zero flow rate even in the case in which the actual gas flow rate is zero. For example, there can be a case in which the gas flow sensor output assumes the maximum value of about 1.3 liter/hour as a result of the variation of the flow sensor output at the zero flow rate. In such a case, the flow sensor output as measured from the newly defined zero point takes a value of about 2.6 liter/hour, while this value substantially exceeds the upper limit of the dead zone of 1.5 liter/hour. Thereby, the flow meter that uses the gas flow sensor produces an output indicative of a non-zero gas flow rate in spite of the fact that there is no actual gas flow. A similar situation occurs also in the approach of the Japanese Laid-Open Patent Publication 8-271307.

Thus, conventional flow meters that use such a flow sensor have a problem in that they may produce an erroneous output indicative of the existence of a gas flow even in such a case in which there is no actual gas flow. This erroneous output can cause a serious problem when the flow meter is used for a gas utility meter, as the gas consumption fee is charged based upon the gas flow rate thus detected by the gas flow sensor.

Thus, it is concluded that, while it is important to conduct a zero point calibration in a gas flow sensor for use in a propane or other gas utility meter in view of the prescribed specification, it is not appropriate to use an arbitrary point in the dead zone for calibrating the zero point of the gas flow sensor output.

SUMMARY OF THE INVENTION

Accordingly, it is a general object of the present invention to provide a novel and useful method of calibrating an output of a gas flow sensor with regard to aging wherein the foregoing problems are successfully eliminated.

Another and more specific object of the present invention is to provide a method of calibrating an output of a gas flow sensor with regard to aging with reliability.

Another object of the present invention is to provide a method of calibrating an output of a gas flow sensor with regard to the parallel shift of the gas flow sensor output characteristic curve caused by aging and further to the change of gradient of the flow sensor output characteristic curve caused also by aging.

Another object of the present invention is to provide a method of calibrating an output of a fluid flow sensor for use in a flow meter, said fluid flow sensor detecting a flow rate of a fluid and producing an output corresponding to a detected flow rate of said fluid, said flow meter having a dead zone and processing said output of said fluid flow sensor such that said flow meter produces a zero output indicative of zero flow rate when said output of said flow sensor is smaller than a threshold of said dead zone, said method comprising the steps of:

detecting a transition of said output of said flow sensor from a state in which said output of said flow sensor exceeds said threshold of said dead zone to a state in which said output of said flow sensor goes below said threshold;

detecting said output of said flow sensor after said transition; and resetting a zero point output of said flow meter in response to said output of said flow sensor detected after said transition.

According to the present invention, a reliable detection of the zero-flow rate becomes possible by detecting the output of the flow sensor immediately after the foregoing transition, which occurs in correspondence to the interruption of the fluid, for the calibration of the zero point of the flow meter.

Other objects and further features of the present invention will become apparent from the following detailed description when read in conjunction with the attached drawings.

DETAILED DESCRIPTION OF THE INVENTION

[Principle]

Figure 3A:
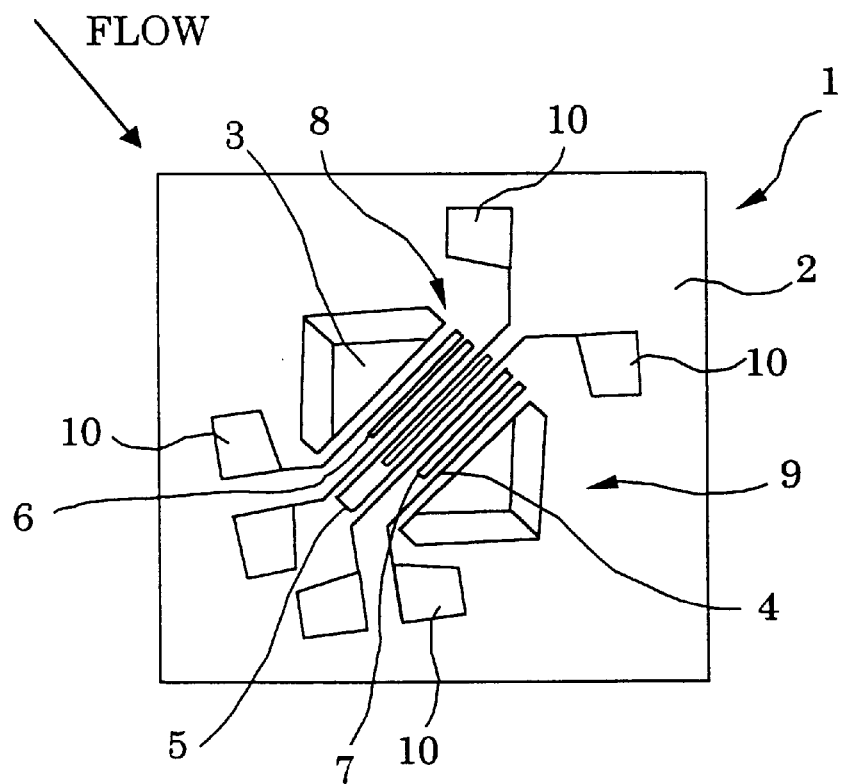
FIGS. 3A and 3B are diagrams showing the construction of a flow sensor.
Figure 3B:
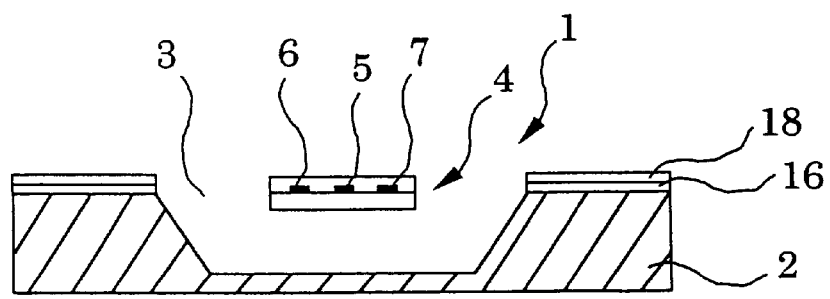
Figure 4:
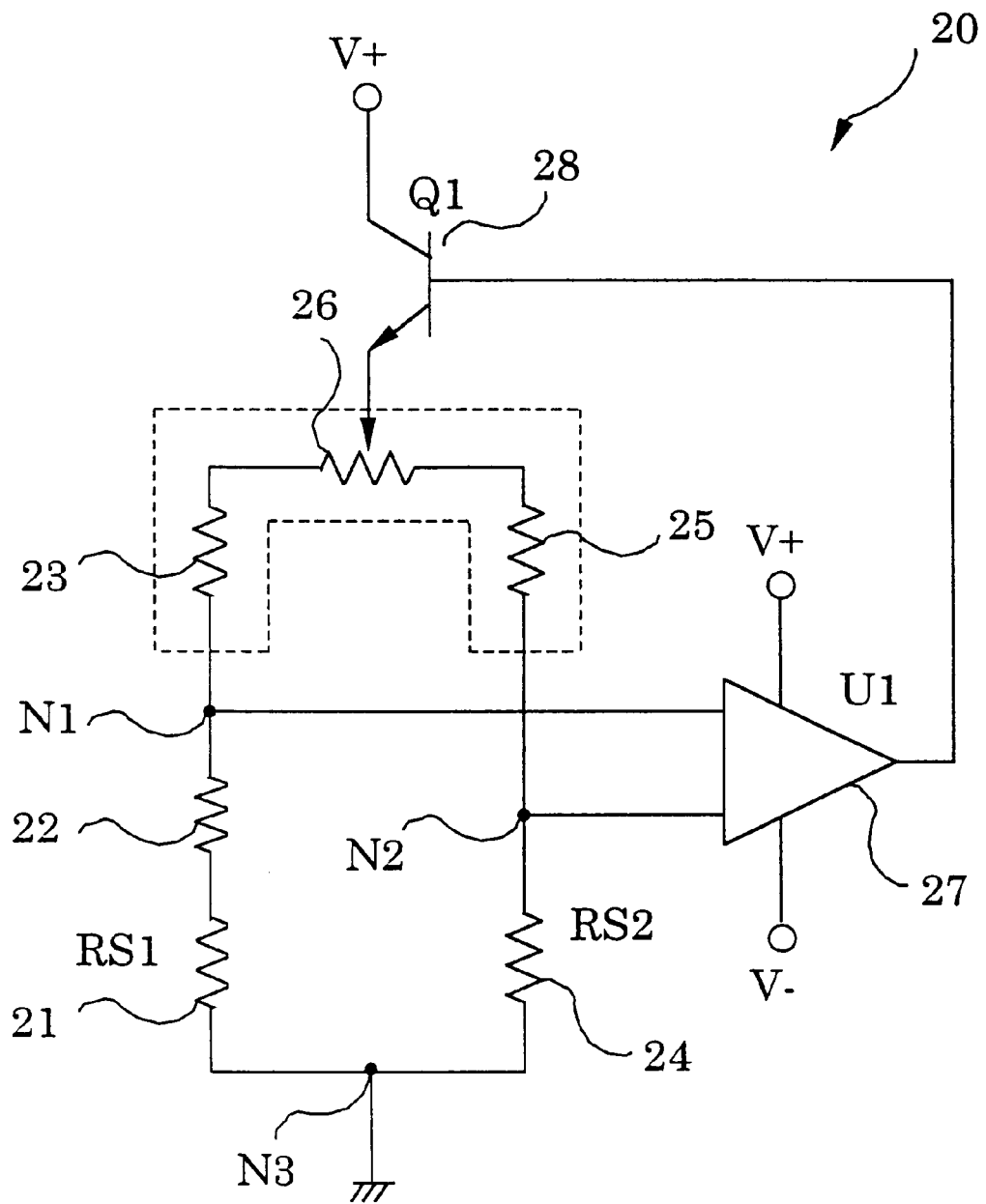
FIG. 4 is a circuit diagram used for driving the flow sensor of FIGS. 3A and 3B.

FIGS. 3A and 3B are diagrams showing the construction of a flow sensor 1 used in the present invention for measuring the flow rate of a gas flow, while FIG. 4 shows a driver circuit 20 used for driving the flow sensor 1 of FIGS. 3A and 3B. The construction of the illustrated flow sensor or the driver circuit itself is known for example from the U.S. patent application Ser. Nos. 08/815,529 or 08/862,413, which are incorporated herein by reference.

Referring to FIGS. 3A and 3B, the flow sensor 1 is formed on a Si substrate 2 having a (100)-oriented crystal surface and includes a depression 3 formed typically by a wet etching process. The Si substrate 2 further carries thereon an oxide film 16 wherein the oxide film 16 forms a bridging part 4 bridging across the depression 3. Further, the bridging part 4 carries thereon a heat sensor 5 that changes the value of resistance with temperature, and resistance strips 6 and 7 are disposed at both sides of the heat sensor 5 on the bridging part 4. Further, the heat sensor 5 and the resistance strips 6 and 7 are covered by an oxide film 18. The heat sensor 5, the resistance strip 6 and the resistance strip 7 have respective contact pads 10 formed on the oxide film 16 covering the Si substrate 1.

In operation, a gas is caused to flow through the depression 3 diagonally as indicated in FIG. 3A while energizing the resistance strip 6 or 7 located at the upstream side of the heat sensor 5, and the temperature change of the heat sensor 5 is detected by measuring the resistance thereof by the driver circuit of FIG. 4.

Referring to FIG. 4, the driver circuit 20 forms a balanced bridge circuit and includes resistors 21, 22 and 23 connected in series to form one of the branches of the bridge circuit, wherein the resistor 21 corresponds to the resistance strip forming the heat sensor 5 of the flow sensor 1. Further, the driver circuit 20 includes resistors 24 and 25 connected in series to form a second branch of the bridge circuit, wherein the resistor 24 corresponds to one of the resistance strips 6 and 7. Further, respective ground ends of the first and second branches are connected to each other at a node $N_3$ to the ground, and respective opposite ends of the first and second branches are connected to each other by a resistor 26 to which a d.c. supply voltage is supplied via a control transistor 28.

Further, the driver circuit 20 includes a differential amplifier 27 that detects a voltage difference between a node $N_1$ between the resistor 23 and the resistor 22 of the first branch and a node $N_2$ between the resistor 24 and the resistor 25 of the second branch. Thereby, the differential amplifier 27 produces an output indicative of the foregoing voltage difference and the output of the differential amplifier 27 is supplied to the control transistor 28 for controlling the balance of the first and second branches via the resistor 26. The output of the differential amplifier 27 is used also as the output of the flow sensor 1.

Figure 5A:
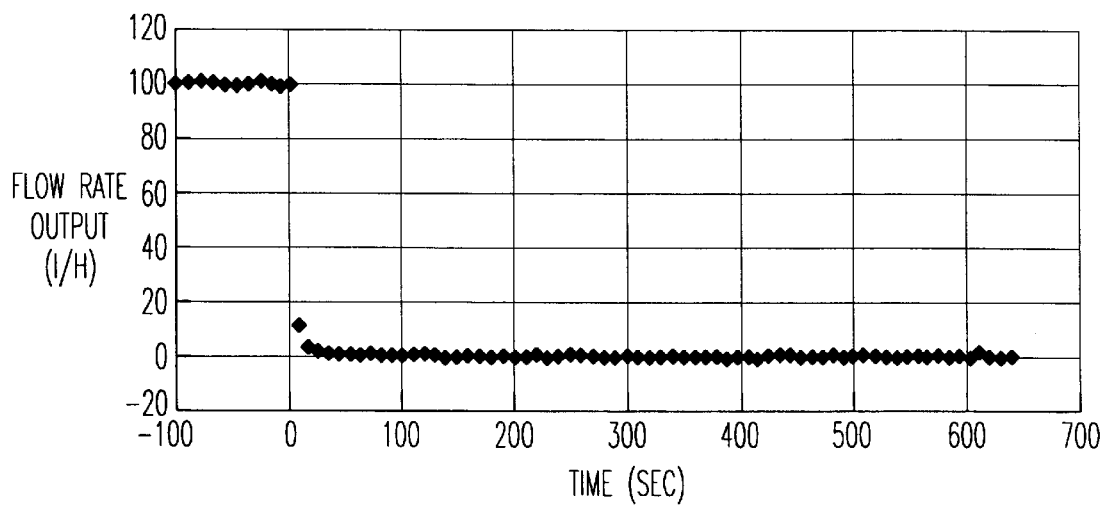
FIGS. 5A and 5B are diagrams showing the principle of the present invention.
Figure 5B:
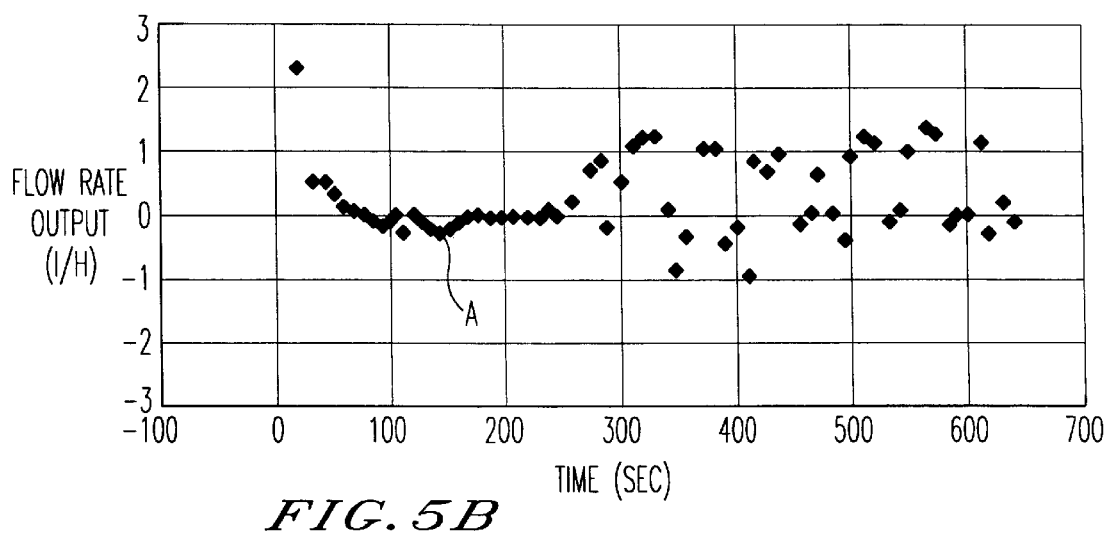

FIGS. 5A and 5B show the output of the flow sensor 1 in an experiment conducted by the inventor of the present invention in which the flow of the air through a flow path having a width of 5 mm and a length of 25 mm is interrupted by closing a valve, wherein FIG. 5B shows the output of FIG. 5A in an enlarged scale.

Referring to FIGS. 5A and 5B, it should be noted that the air flow has been flowing through the flow path with a flow rate of 100 liter/hour before the closure of the valve, and the output of the flow sensor 1 drops sharply in correspondence to the closure of the valve.

It is interesting to note that the output of FIG. 5B is stabilized at the zero flow rate (0 liter/hour) immediately after the interruption of the air flow, more precisely after about 30 seconds from the closure of the valve. Further, it is noted that the foregoing state of stable zero output of the flow sensor 1 continues for about 250 seconds from the instance of closure of the valve. Thereafter, it can be seen that the output of the flow sensor starts to fluctuate variously.

The discovery of FIGS. 5A and 5B indicates that the output of the flow sensor immediately after the interruption of the gas flow or air flow is stationary and can be used as an effective reference for calibrating the zero point of the flow meter that uses the flow sensor. For example, the minimum of the zero flow rate output represented in FIG. 5B by an arrow A may be used for the zero point calibration.

[First Embodiment]

Figure 6:
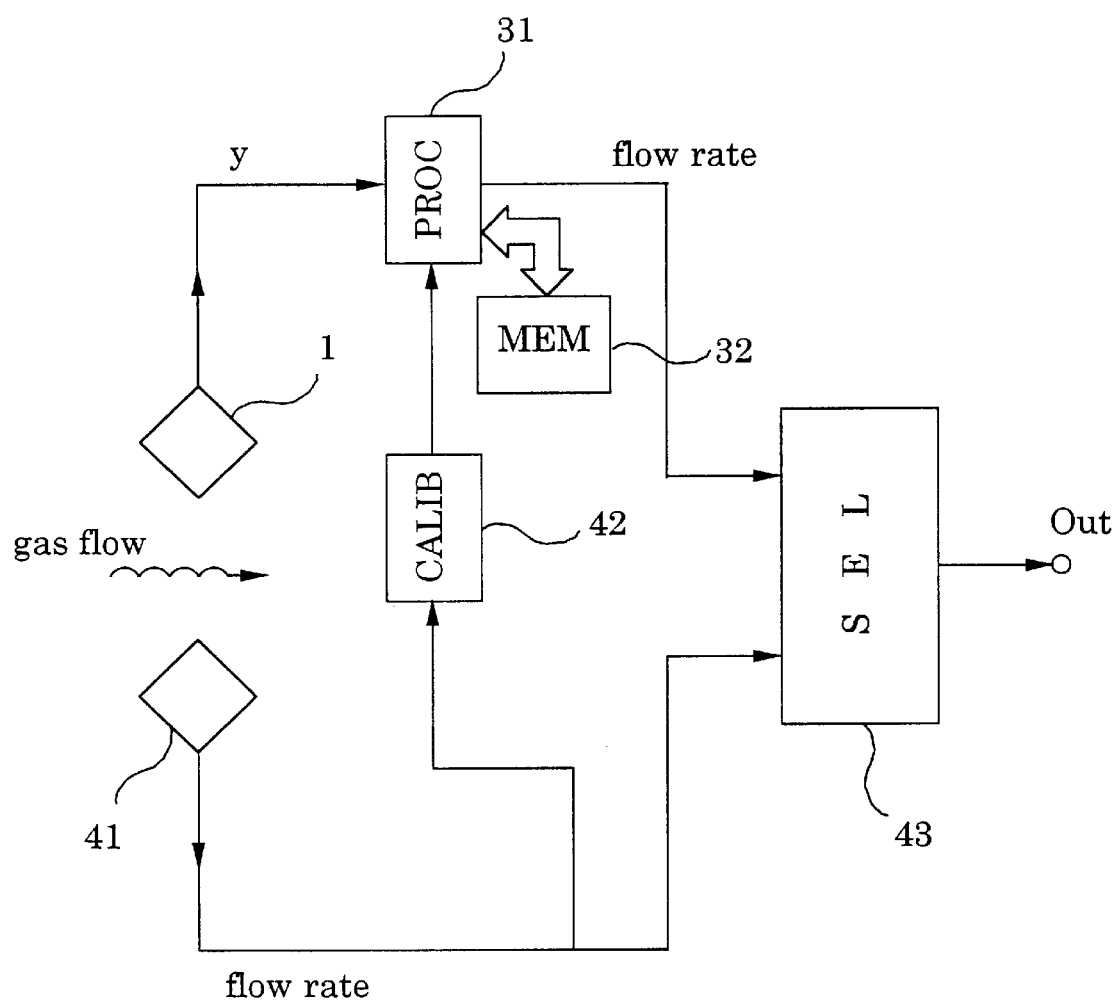
FIG. 6 is a block diagram showing the construction of a composite flow meter according to a first embodiment of the present invention.

FIG. 6 shows the construction of a composite flow meter according to a first embodiment of the present invention.

Referring to FIG. 6, the flow meter includes the flow sensor 1 described previously with reference to FIGS. 3A and 3B for detecting the gas flow rate, wherein the flow meter of FIG. 6 further includes a well known fluidic sensor 41 such as the one disclosed in the Japanese Laid-Open Patent Publication 2-193019 or 4-326018 for detecting the gas flow rate in the flow rate range of 125–2500 liter/hour.

Thus, the flow sensor 1 is used for detecting the flow rate in the range below 150 liter/hour, similarly to the case of the flow sensor disclosed in the Japanese Laid-Open Patent Publication 3-264821, op. cit. Thereby, the flow rate in the range between 125 liter/hour and 150 liter/hour can be measured by both the flow sensor 1 and the fluidic sensor 41.

Figure 7:
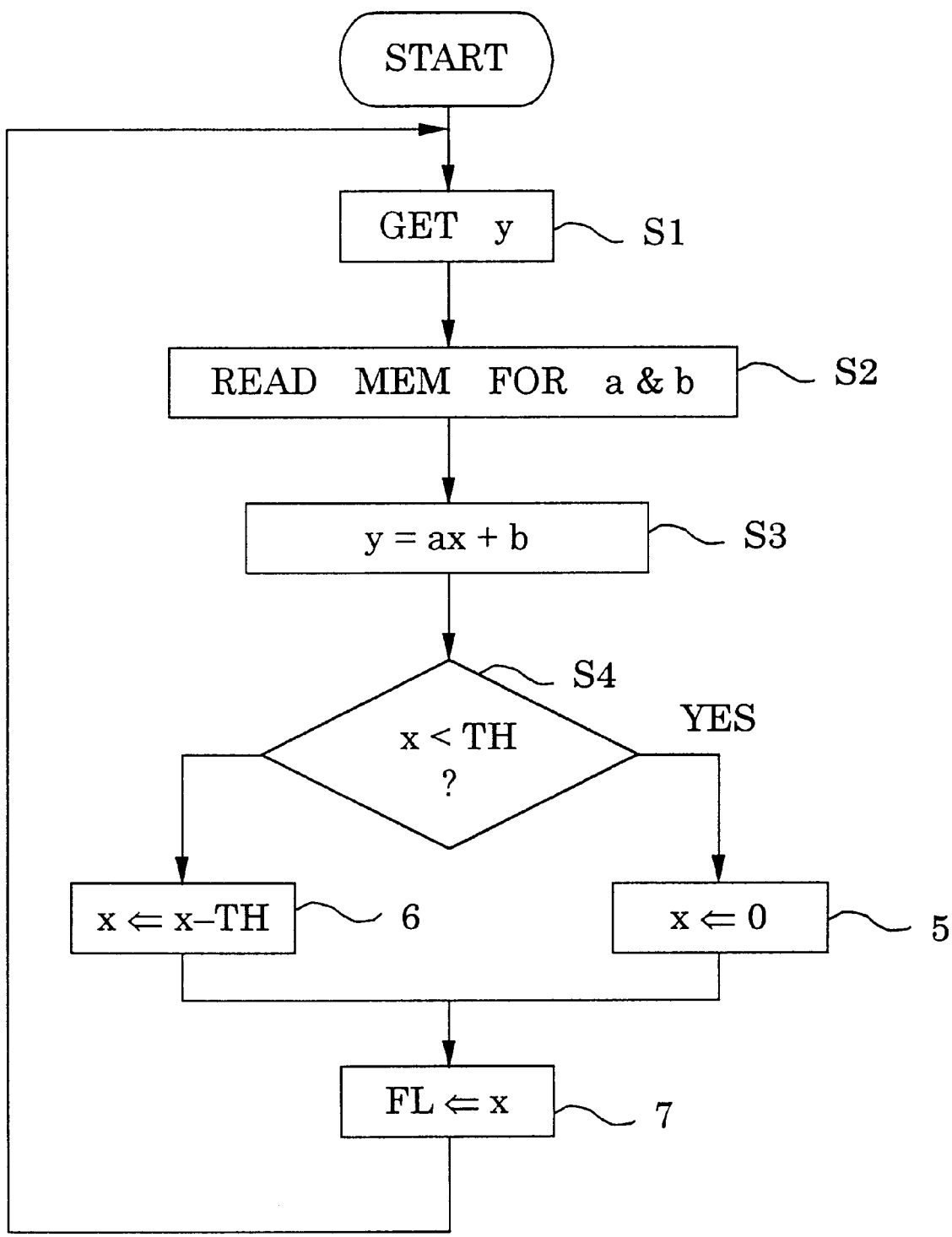
FIG. 7 is a flowchart showing the operation of the flow sensor used in the composite flow meter of FIG. 6 in an ordinary operational mode.

In the construction of FIG. 6, it should be noted that the output y of the flow sensor 1 is supplied, after an analog-to-digital conversion (not illustrated) to a processor 31, wherein the processor 31 cooperates with a memory 32, which may be an EPROM or a flash memory, and processes the output y of the flow sensor 1 according to the procedure in the flowchart of FIG. 7.

Referring to FIG. 7, the process starts with a step S1 wherein the processor 31 receives the output y of the flow sensor and the processor 31 further refers to the memory 32 in the next step S2 for parameters a and b stored therein.

Next, in the step S3, the processor 31 converts the output y of the flow sensor 1 to a corresponding flow rate x according to the relationship of $$y=ax+b$$

while using the parameters a and b read out previously in the step S2 from the memory 32.

The flow rate x thus obtained is then subjected to a discrimination process in the step S4 as to whether or not the flow rate x exceeds a predetermined threshold TH of the dead zone.

If the result of the step S4 is YES, a step S5 is conducted in which the flow rate x is set to zero. Further, if the result of the step S5 is NO, a step S6 is conducted in which the threshold TH is subtracted from the observed flow rate x.

Further, the flow rate x thus obtained is then supplied in the step S7 to a selection circuit 43 represented in FIG. 6.

Referring back to FIG. 6, the selection circuit 43 further receives the output of the fluidic sensor 41 and selects one of the output of the flow sensor 1 thus processed by the processor 31 and the output of the fluidic sensor 41 such that the output of the flow sensor 1 is selected when the flow rate x is smaller than the value of 125 liter/hour. Further, the selection circuit 43 selects the output of the fluidic sensor 41 when the detected flow rate exceeds the value of 125 liter/hour.

Figure 8:
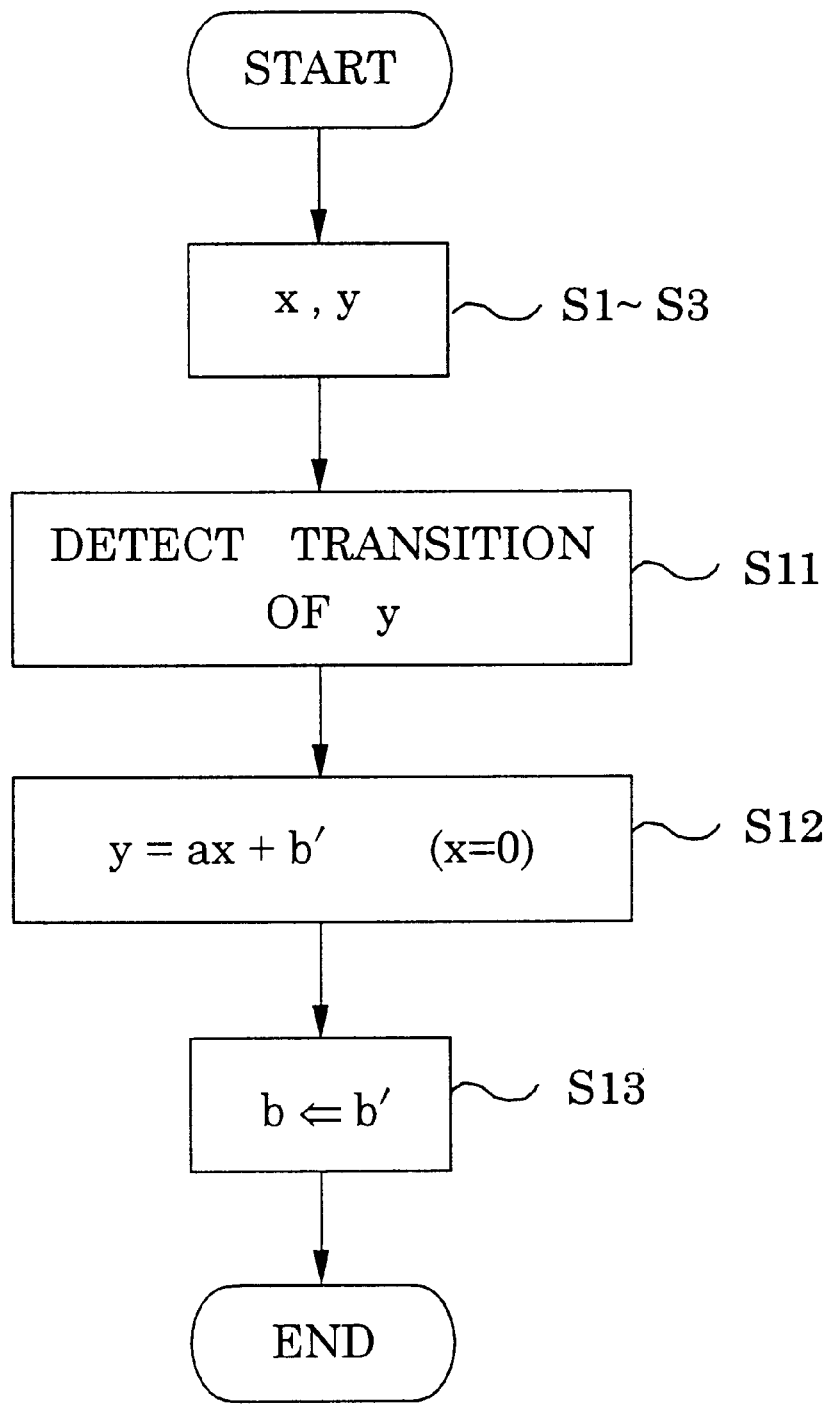
FIG. 8 is a flowchart showing the operation of the flow sensor in the composite flow meter of FIG. 6 in a zero point calibration mode.

In the flow meter of FIG. 6, it is possible to calibrate the zero point of the flow sensor 1 according to the calibration procedure of FIG. 8.

Referring to FIG. 8, showing the operation of the flow meter in the such a calibration mode, the flow rate x is obtained from the output y of the flow sensor 1 in the first step corresponding to the steps S1–S3 of FIG. 7, and a step S11 is conducted subsequently for detecting the transition of the flow sensor output y indicating that the flow rate x goes below the threshold TH from the state in which the flow rate x is higher than the threshold TH.

Next, in the step S12, a new value b' of the parameter b, which satisfies the relationship $$y=ax+b' \text{ for } x=0, \text{ or } y=b'$$

is calculated based upon the value of the flow sensor output y immediately after the transition, and the parameter b in the memory 32 is rewritten in the step S13 by the parameter b' thus obtained in the step S12. It should be noted that the parameter b' is determined such that the flow rate x becomes zero immediately after the transition of the flow sensor output y.

As noted already with reference to FIGS. 5A and 5B, the flow rate x, and hence the flow sensor output y, of the flow sensor 1 is stabilized immediately after the shutting off of the gas flow, and the parameter b corresponding to the zero point of the flow sensor output y is successfully calibrated, by setting the parameter b to b' such that the flow rate output x becomes zero in the state immediately after the foregoing transition of the flow rate. By using the parameter b' thus obtained in the process of FIG. 7 for the parameter b, the effect of aging of the flow sensor output is successfully compensated for with regard to the drifting of the zero point.

[Second Embodiment]

Figure 9:
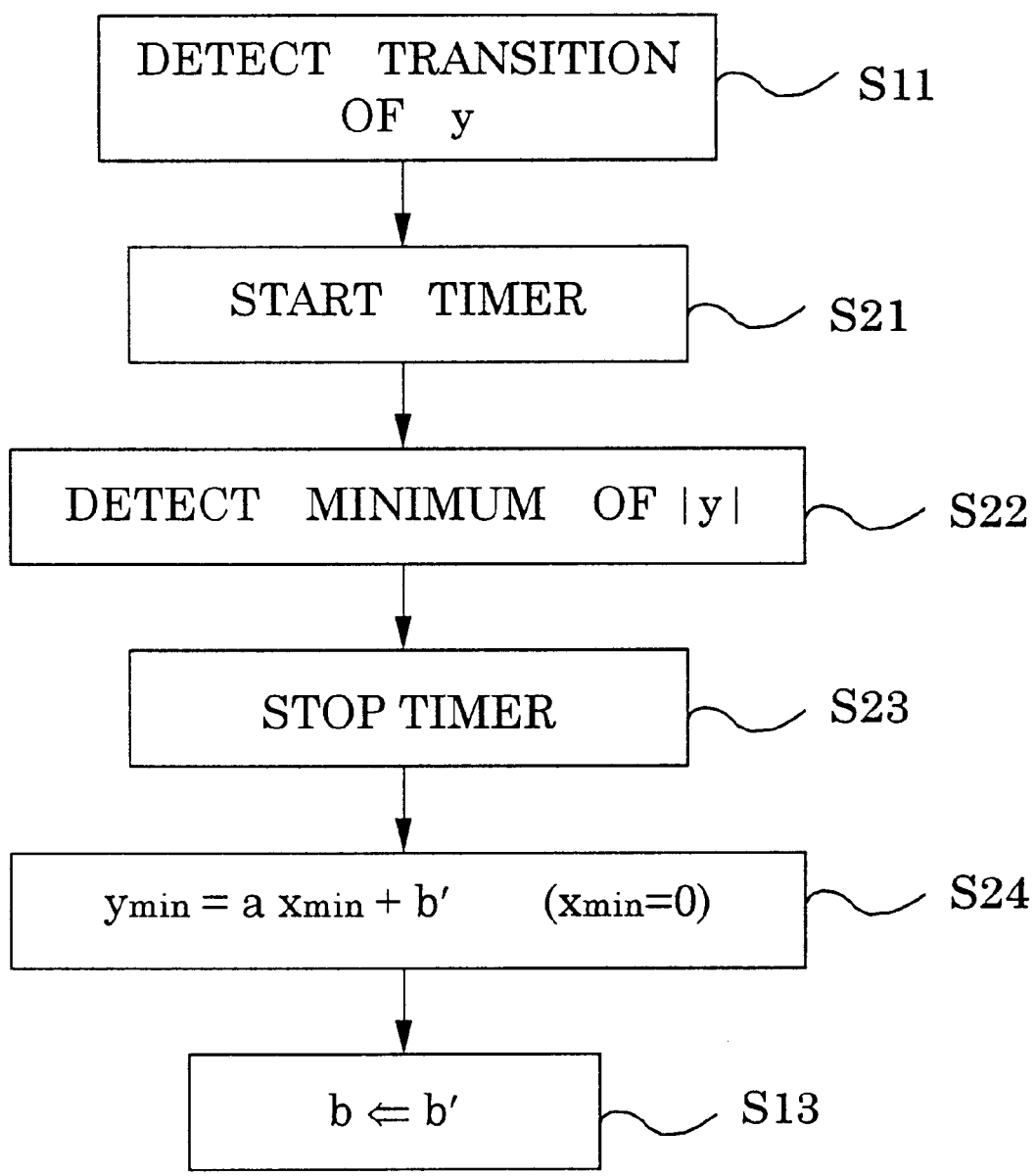
FIG. 9 is a flowchart showing the operation of the flow sensor in the composite flow meter of FIG. 6 for zero point correction according to a second embodiment of the present invention.

FIG. 9 shows the calibration process conducted in the flow meter of FIG. 6 for correcting the zero point of the flow sensor output y according to a second embodiment of the present invention, wherein those steps corresponding to the steps described before are designated by the same reference numerals and the description thereof will be omitted.

Referring to FIG. 9, the calibration process starts with the step S11 for detecting the transition of the flow sensor output y similarly to the process of FIG. 8 and the step S21 follows the step S11, wherein the step S21 starts a timer in the processor 31 in response to the detection of the foregoing transition of the flow sensor output y. Further, the step S22 is conducted while running the timer for detection of the minimum of the absolute value of the flow sensor output y corresponding to the point A of FIG. 5B.

After a predetermined duration, which may be set to about 250 seconds in view of the relationship of FIG. 5B, the timer is stopped in the step S23, and the process of the step S24 is conducted similarly to the step S12 of FIG. 8 while using the flow rate $x_{min}$ corresponding to the flow sensor output $y_{min}$ obtained in the step S22, for evaluation of the parameter b'.

After the step S24, the parameter b' is written into the memory 32 similarly to the step S13 of FIG. 8.

By using the minimum of the flow sensor output immediately after the transition corresponding to the point A of FIG. 5B, the reliability of the zero point calibration of the flow sensor output is improved substantially.

[Third Embodiment]

Figure 10:
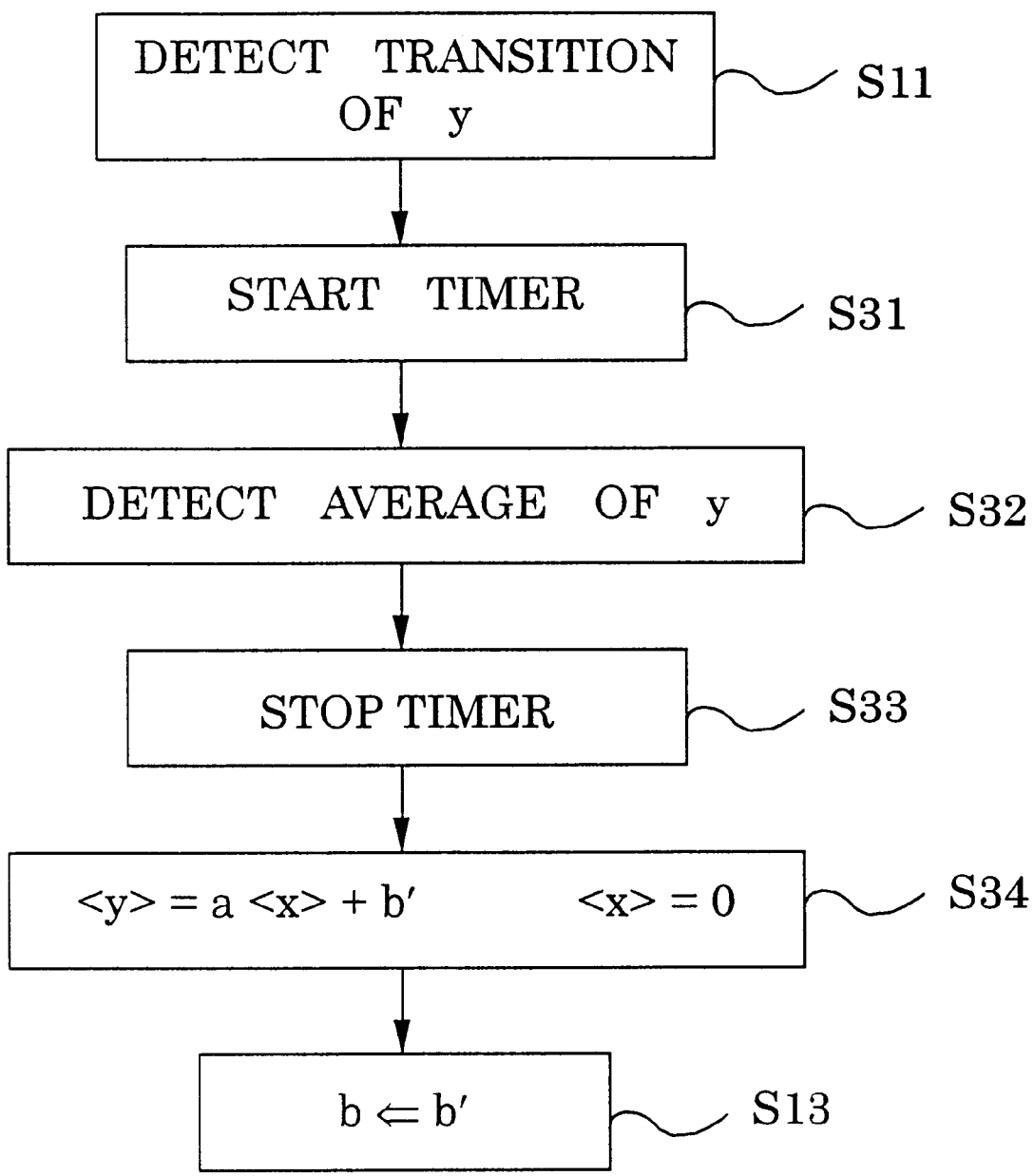
FIG. 10 is a flowchart showing the operation of the flow sensor in the composite flow meter of FIG. 6 for zero point correction according to a third embodiment of the present invention.

FIG. 10 shows the calibration process conducted in the flow meter of FIG. 6 for correcting the zero point of the flow sensor output y according to a third embodiment of the present invention, wherein those steps corresponding to the steps described before are designated by the same reference numerals and the description thereof will be omitted.

Referring to FIG. 10, the calibration process starts with the step S11 for detecting the transition of the detected flow sensor output y similarly to the process of FIG. 8 and the step S31 follows the step S11, wherein the step S31 starts a timer in the processor 31 in response to the detection of the foregoing transition of the flow sensor output y. Further, the step S32 is conducted while running the timer for calculating the average of the flow sensor output y (<y>) and corresponding average of the flow rate x (<x>).

After a predetermined duration, which may be set to about 250 seconds in view of the relationship of FIG. 5B, the timer is stopped in the step S33, and the process of the step S34 is conducted similarly to the step S12 of FIG. 8 while using the flow sensor output average <y> and the flow rate average <x> obtained in the step S32, for evaluation of the parameter b'.

After the step S34, the parameter b' is written into the memory 32 similarly to the step S13 of FIG. 8.

By using the average of the flow sensor output immediately after the transition corresponding to the point A of FIG. 5B, the reliability of the zero point calibration of the flow sensor output is improved substantially.

[Fourth Embodiment]

Figure 11:
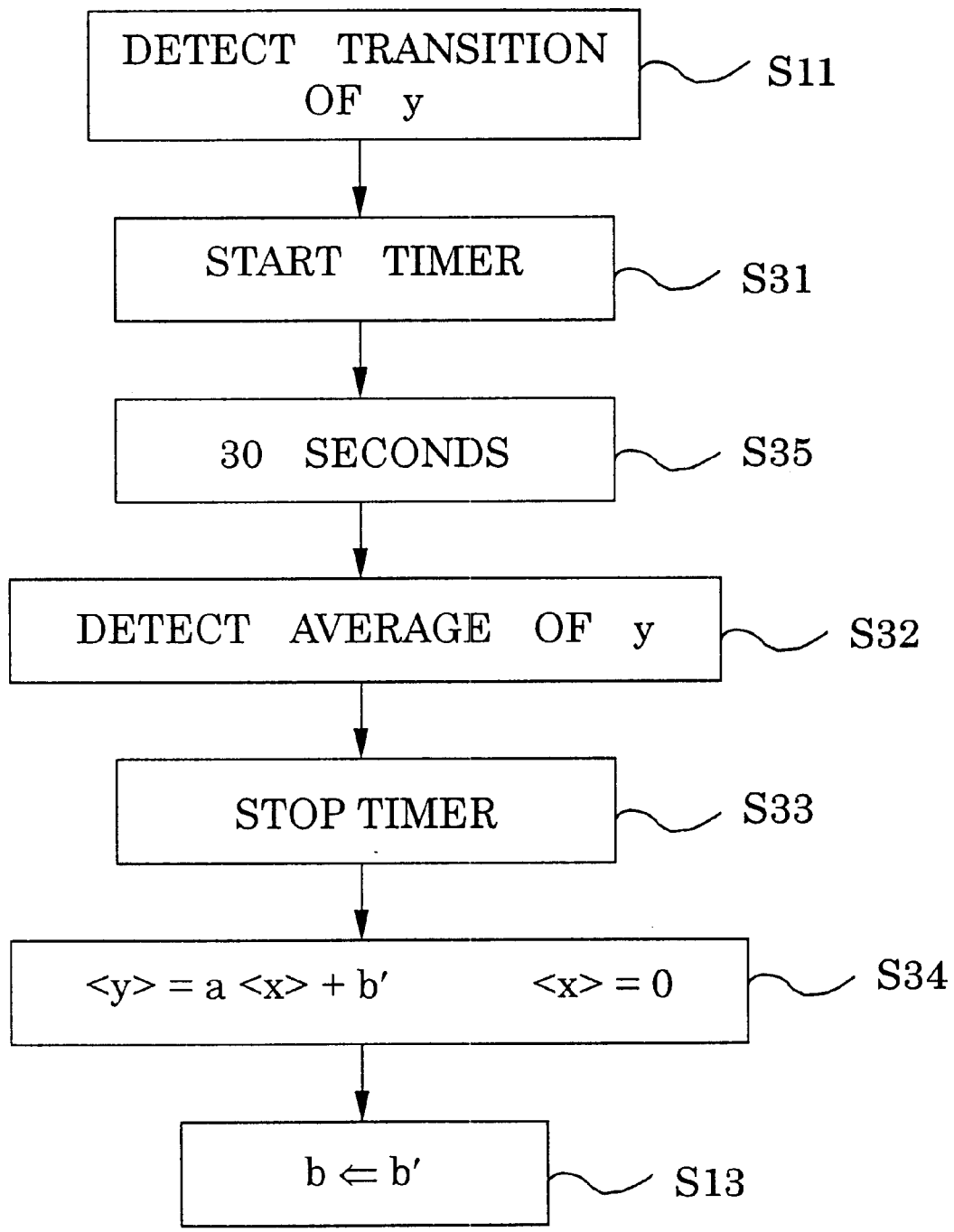
FIG. 11 is a flowchart showing the operation of the flow sensor in the composite flow meter of FIG. 6 for zero point correction according to a fourth embodiment of the present invention.

FIG. 11 shows the calibration process according to a fourth embodiment of the present invention, wherein those steps corresponding to the steps described previously are designated by the same reference numerals and the description thereof will be omitted.

Referring to FIG. 11, the process of the present embodiment is substantially identical with the process of FIG. 10 except that there is provided a step S35 after the step S31 for waiting for a predetermined time interval such as 30 seconds for avoiding possibility of using erroneous or inappropriate data that may occur immediately after the transition, as can be seen in FIGS. 5A and 5B after about 10 seconds from the occurrence of the transition. Thereby, the averaging process of the step S32 is continued until the timer counts the duration of about 250 seconds from the occurrence of the transition.

According to the present embodiment, the reliability of the averaged data <x> or <y> is improved by using only the reliable data while rejecting the data that may include possible errors.

[Fifth Embodiment]

Figure 12:
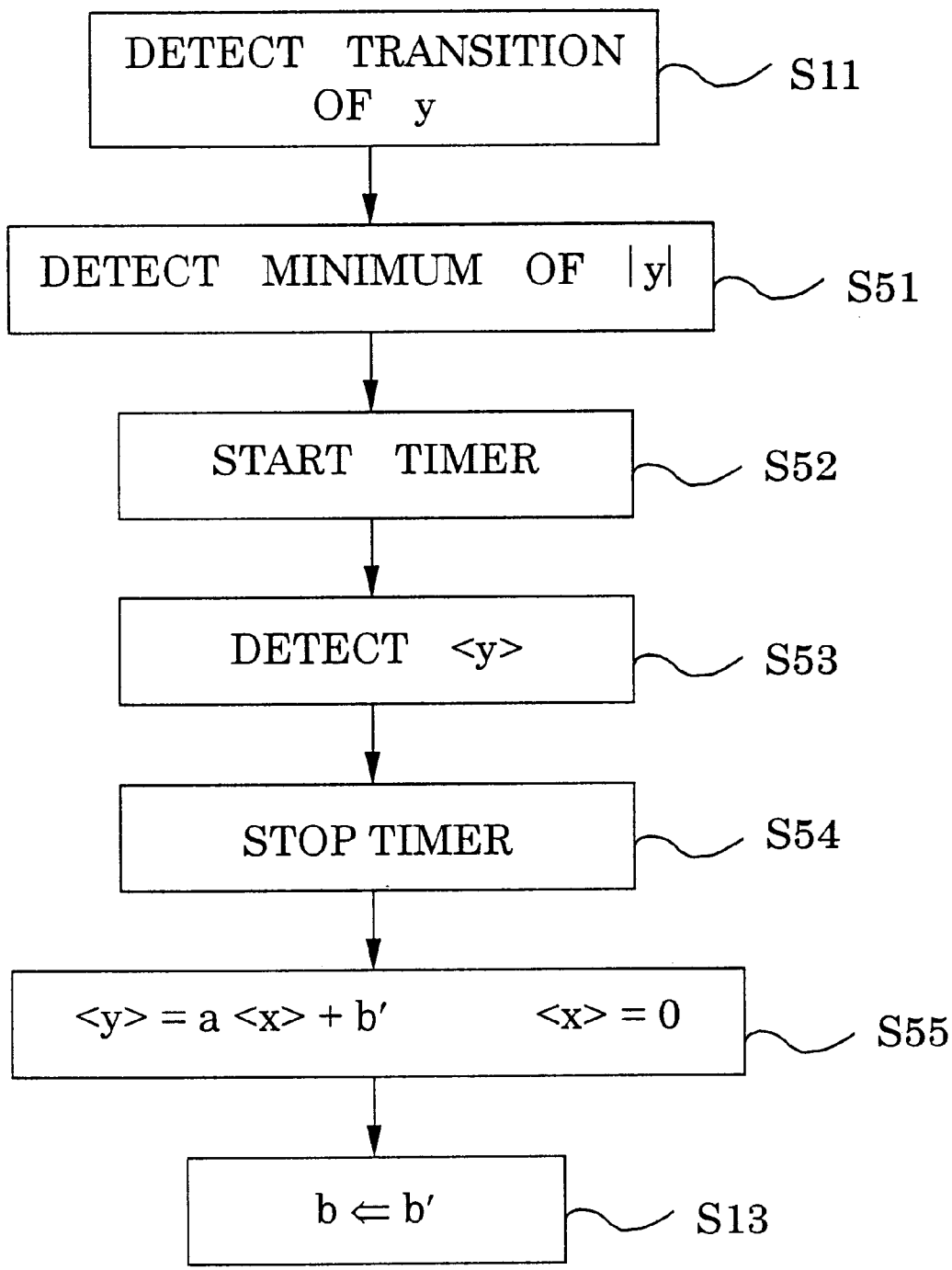
FIG. 12 is a flowchart showing the operation of the flow sensor in the composite flow meter of FIG. 6 for zero point correction according to a fifth embodiment of the present invention.

FIG. 12 shows the calibration process according to a fifth embodiment of the present invention, wherein those steps corresponding to the steps described previously are designated by the same reference numerals and the description thereof will be omitted.

Referring to FIG. 12, the process starts with the step S11 similarly to the previous embodiments, wherein the step S51 follows the step S11 for detecting the minimum of the absolute value of the flow sensor output y.

Next, in the step S52, the timer is started similarly to the previous embodiments, and the average of the flow sensor output <y> is detected in the step S53 while running the timer, until it is judged in the step S54 that a predetermined duration has elapsed. Further, the step S54, which is similar to the process of the step S34 of FIG. 11 is conducted for evaluating the parameter b' that sets the value of the flow rate indicated by the flow sensor output to zero. Then, the process returns to the step S13 of FIG. 8 and the parameter b' is stored in the memory 32 as the parameter b.

[Sixth Embodiment]

Referring back to FIG. 6, the composite flow meter 6 further includes an aging compensation unit 42 used for compensating for the aging of the flow sensor 1 by the output of the fluidic sensor 41. As noted already, there is an overlapping flow rate range of 125–150 liter/hour, in which both the output of the fluidic sensor 41 and the output of the flow sensor 1 are available. Thus, it is possible to calibrate, in view of the successful zero point calibration of the flow sensor output achieved by the foregoing embodiments, to further calibrate the gradient of the output characteristic of the flow sensor 1 by using the aging compensation unit 42.

Figure 1:
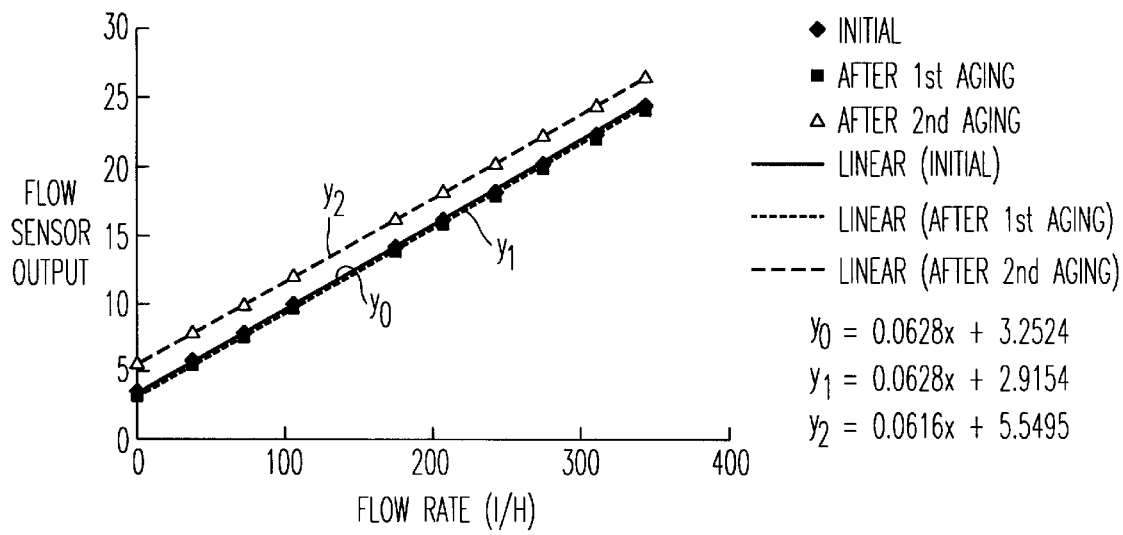
FIG. 1 is a diagram showing the aging effect of a flow sensor output.
Figure 2:
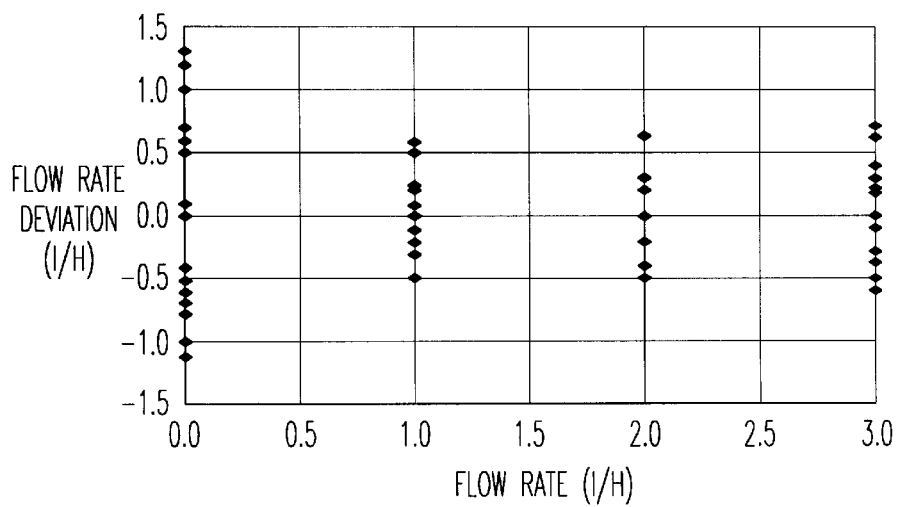
FIG. 2 is a diagram showing the fluctuation occurring in the flow sensor output.

As noted previously, there can occur a change of gradient in the flow sensor output characteristic after several years of use of the flow sensor. This problem of change of the gradient of the flow sensor output characteristic appears particularly conspicuously in the flow sensors that are required to produce a large sensor output for high sensitivity flow rate detection, as such a high sensitivity flow rate detection requires the driving of the resistance strip 6 or 7 of the flow sensor 1 (see FIG. 1) with a large drive current such that the resistance strip 6 or 7 is heated to a high temperature.

Figure 13:
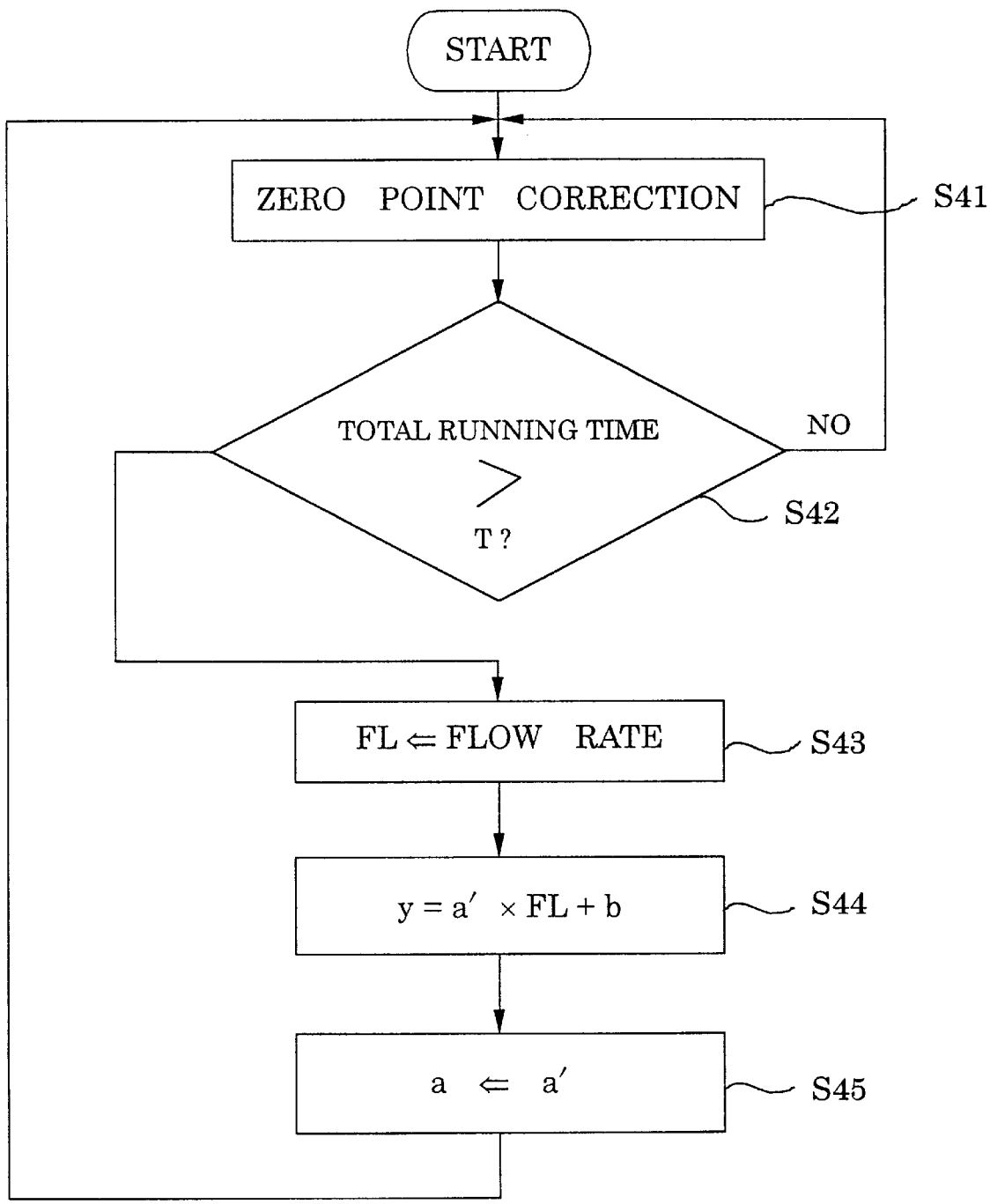
FIG. 13 is a flowchart showing the operation of the composite flow meter of FIG. 6 for a gradient correction of the flow sensor output according to a sixth embodiment of the present invention.

FIG. 13 shows the calibration process conducted by the aging compensation unit 42.

Referring to FIG. 13, the process starts with the step S41 in which the zero point correction of the flow sensor 1 is conducted according to any of the foregoing processes, until it is judged in the step S42 that the total running time of the composite flow meter of FIG. 6 exceeds a predetermined time T.

When the predetermined time T has elapsed, the flow rate of the gas is measured in the step S43 by the flow sensor 1 and also by the fluidic sensor 41 while setting the gas flow rate to the overlapping flow rate range of 125–150 liter/hour.

Next, in the step of S44, the relationship between the output y of the flow sensor 1 and the flow rate FL of the gas obtained by the fluidic sensor 41 is obtained according to the relationship of $$y = a' \times FL + b$$

wherein the parameter b is obtained previously by the zero point correction process of the step S41. Thus, the parameter a' of the foregoing relationship, indicative of the gradient of the flow sensor output characteristic, is obtained in the step S44 and the parameter a' thus obtained is stored in the memory 32 in the step S45 as the parameter a.

After the step S45, the total running time is cleared and the process returns to the step S41 for the next calibration process.

According to the present embodiment, it is possible to calibrate the gradient of the flow sensor output characteristic by using the flow rate obtained by the fluidic sensor 41 and further by using the zero point or intercept b calibrated according to the process of any of the first through fifth embodiments.

Further, the present invention is by no means limited to the embodiments described heretofore, but various variations and modifications may be made without departing from the scope of the invention.

What is claimed is:

1. A method of calibrating an output of a flow sensor for use in a flow meter, said flow sensor detecting a flow rate of a fluid and producing an output corresponding to a detected flow rate of said fluid, said flow meter having a dead zone and processing said output of said flow sensor such that said flow meter produces a zero output indicative of zero flow rate when said output of said flow sensor is smaller than a threshold of said dead zone, said method comprising the steps of:

detecting a transition of said output of said flow sensor from a state in which said output of said flow sensor exceeds said threshold of said dead zone to a state in which said output of said flow sensor goes below said threshold;

detecting said output of said flow sensor after said transition; and resetting a zero point output of said flow meter in response to said output of said flow sensor detected after said transition.

2. A method as claimed in claim 1, wherein said step of detecting said output of said flow sensor after said transition includes a step of detecting a minimum of an absolute value of said output of said flow sensor in a predetermined duration starting from an instance of said transition.

3. A method as claimed in claim 1, wherein said step of detecting said output of said flow sensor after said transition includes a step of detecting an average of said output of said flow sensor in a predetermined duration starting from an instance of said transition.

4. A method as claimed in claim 1, wherein said step of detecting said output of said flow sensor after said transition includes a step of detecting an average of said output of said flow sensor in a predetermined duration starting after a predetermined time has elapsed from an instance of said transition.

5. A method as claimed in claim 1, wherein said step of detecting said output of said flow sensor after said transition includes the steps of: detecting a minimum of an absolute value of said output of said flow sensor after said transition of said output of said flow sensor; and detecting an average of said output of said flow sensor after an instance of detection of said minimum of said output of said flow sensor.

6. A method as claimed in claim 1, wherein said step of resetting zero point includes the steps of: substituting said output of said flow sensor and a corresponding flow rate into a characteristic equation describing the relationship between said output of said flow sensor and said corresponding flow rate; and adjusting an intercept of said characteristic equation such that said flow rate becomes zero in correspondence to said output of said flow sensor occurring after said transition.

7. A method as claimed in claim 6, further comprising, after said step of resetting zero point, the steps of:
  detecting a flow rate simultaneously by said flow sensor and a separate sensor; and
  adjusting a gradient of said characteristic equation such that said output of said flow sensor indicates a flow rate coincident to said flow rate detected by said separate sensor.

8. A method as claimed in claim 7, wherein said step of adjusting a gradient of said characteristic equation is conducted after a predetermined time interval has elapsed from a start of use of said flow sensor.

9. A method of calibrating an output of a flow sensor for use in a flow meter, said flow sensor detecting a flow rate of a fluid and producing an output corresponding to a detected flow rate of said fluid, said flow meter having a dead zone and processing said output of said flow sensor such that said flow meter produces a zero output indicative of zero flow rate when said output of said flow sensor is smaller than a threshold of said dead zone, said method comprising the steps of:
  detecting a transition of said output of said flow sensor from a state in which said output of said flow sensor exceeds said threshold of said dead zone to a state in which said output of said flow sensor goes below said threshold;
  detecting said output of said flow sensor within 250 seconds after said transition; and resetting a zero point output of said flow meter in response to said output of said flow sensor detected after said transition.

10. A method as claimed in claim 9, wherein said step of detecting said output of said flow sensor after said transition includes a step of detecting a minimum of an absolute value of said output of said flow sensor within the 250 seconds after said transition.

11. A method as claimed in claim 9, wherein said step of detecting said output of said flow sensor after said transition includes a step of detecting an average of said output of said flow sensor within the 250 seconds after said transition.

12. A method as claimed in claim 9, wherein said step of detecting said output of said flow sensor after said transition includes a step of detecting an average of said output of said flow sensor within the 250 seconds starting after a predetermined time of 10 seconds has elapsed after said transition.

13. A method as claimed in claim 9, wherein said step of detecting said output of said flow sensor after said transition includes the steps of: detecting a minimum of an absolute value of said output of said flow sensor within the 250 seconds after said transition of said output of said flow sensor; and detecting an average of said output of said flow sensor after an instance of detection of said minimum of said output of said flow sensor.

14. A method as claimed in claim 9, wherein said step of resetting zero point includes the steps of: substituting said output of said flow sensor and a corresponding flow rate into a characteristic equation describing the relationship between said output of said flow sensor and said corresponding flow rate; and adjusting an intercept of said characteristic equation such that said flow rate becomes zero in correspondence to said output of said flow sensor occurring after said transition.

15. A method as claimed in claim 14, further comprising, after said step of resetting zero point, the steps of:
  detecting a flow rate simultaneously by said flow sensor and a separate sensor; and
  adjusting a gradient of said characteristic equation such that said output of said flow sensor indicates a flow rate coincident to said flow rate detected by said separate sensor.

16. A method as claimed in claim 15, wherein said step of adjusting a gradient of said characteristic equation is conducted after a predetermined time interval has elapsed from a start of use of raid flow sensor.

* * * * *